(12) United States Patent
Marupaduga

(10) Patent No.: US 11,463,209 B2
(45) Date of Patent: *Oct. 4, 2022

(54) DYNAMIC CHANNEL SIZING IN A WIRELESS COMMUNICATION NETWORK

(71) Applicant: T-Mobile Innovations LLC, Overland Park, KS (US)

(72) Inventor: Sreekar Marupaduga, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 17/337,131

(22) Filed: Jun. 2, 2021

(65) Prior Publication Data

US 2022/0094492 A1 Mar. 24, 2022

Related U.S. Application Data

(63) Continuation of application No. 17/030,184, filed on Sep. 23, 2020, now Pat. No. 11,063,713.

(51) Int. Cl.
*H04L 5/00* (2006.01)
*H04B 7/024* (2017.01)

(52) U.S. Cl.
CPC .......... *H04L 5/0035* (2013.01); *H04B 7/024* (2013.01); *H04L 5/0023* (2013.01); *H04L 5/0062* (2013.01)

(58) Field of Classification Search
CPC ... H04L 5/0035; H04L 5/0023; H04L 5/0062; H04B 7/024
See application file for complete search history.

(56) References Cited

U.S. PATENT DOCUMENTS

| | | | |
|---|---|---|---|
| 10,142,074 B2 | 11/2018 | Wang et al. | |
| 10,645,730 B2 | 5/2020 | Cao et al. | |
| 10,673,601 B2 | 6/2020 | Chen et al. | |
| 11,063,713 B1 * | 7/2021 | Marupaduga | ......... H04L 5/0062 |
| 2010/0317364 A1 | 12/2010 | Zhang et al. | |
| 2015/0256314 A1 | 9/2015 | Gauvreau et al. | |
| 2018/0206247 A1 | 7/2018 | Sun et al. | |
| 2019/0020461 A1 | 1/2019 | Yerramalli et al. | |
| 2019/0069325 A1 | 2/2019 | Yerramalli et al. | |
| 2019/0364616 A1 | 11/2019 | Mishra et al. | |
| 2020/0008131 A1 | 1/2020 | Chakraborty et al. | |

* cited by examiner

*Primary Examiner* — Curtis B Odom

(57) ABSTRACT

A wireless communication network serves User Equipment (UEs) over Multiple Input Multiple Output (MIMO) layers. A primary access node wirelessly serves the UEs over a primary amount of MIMO layers in a primary radio channel having a primary channel size. A secondary access node wirelessly serves the UEs over a secondary amount of MIMO layers in a secondary radio channel having a secondary channel size. The primary access node selects a new primary channel size and a new secondary channel size based on the primary amount of MIMO layers and the secondary amount of MIMO layers. The primary access node wirelessly serves the UEs over the primary amount of MIMO layers in the primary radio channel having the new primary channel size. The secondary access node wirelessly serves the UEs over the secondary amount of MIMO layers in the secondary radio channel having the new secondary channel size.

20 Claims, 8 Drawing Sheets

DYNAMIC CHANNEL SIZING IN A WIRELESS COMMUNICATION NETWORK

RELATED CASES

This United States patent application is a continuation of U.S. patent application Ser. No. 17/030,184 that was filed on Sep. 23, 2020 and is entitled "DYNAMIC CHANNEL SIZING IN A WIRELESS COMMUNICATION NETWORK." U.S. patent application Ser. No. 17/030,184 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices using wireless network protocols. Exemplary wireless network protocols include Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN).

The wireless user devices and the wireless access nodes communicate over electromagnetic spectrum that is separated into various radio bands. Typical radio bands are hundreds of megahertz wide. The radio bands are separated into radio channels. Typical radio channels are 20-100 megahertz wide. Adjacent wireless access nodes often use the same radio band, but the adjacent wireless access nodes use different radio channels to avoid interference. For example, a wireless access node may use first channel for the uplink, another channel for the downlink, and the adjacent wireless access nodes would use other channels.

Some wireless use devices have multiple radios to wirelessly communicate with the wireless communication networks. The multi-radio user devices can wirelessly communicate in parallel with multiple wireless access nodes. Unfortunately, the wireless access nodes that serve the multi-radio wireless user devices do not efficiently and effectively share channel bandwidth. Moreover, these wireless access nodes do not properly optimize channel sizes based on dynamic network conditions.

TECHNICAL OVERVIEW

A wireless communication network serves User Equipment (UEs) over Multiple Input Multiple Output (MIMO) layers. A primary access node wirelessly serves the UEs over a primary amount of the MIMO layers in a primary radio channel having a primary channel size. A secondary access node wirelessly serves the UEs over a secondary amount of the MIMO layers in a secondary radio channel having a secondary channel size. The secondary node indicates the secondary amount of the MIMO layers to the primary access node. The primary access node selects a new primary channel size and a new secondary channel size based on the primary amount of the MIMO layers and the secondary amount of the MIMO layers. The primary access node indicates the new secondary channel size to the secondary access node. The primary access node wirelessly serves the UEs over the primary amount of the MIMO layers in the primary radio channel having the new primary channel size. The secondary access node wirelessly serves the UEs over the secondary amount of the MIMO layers in the secondary radio channel having the new secondary channel size.

DETAILED DESCRIPTION

Figure 1:
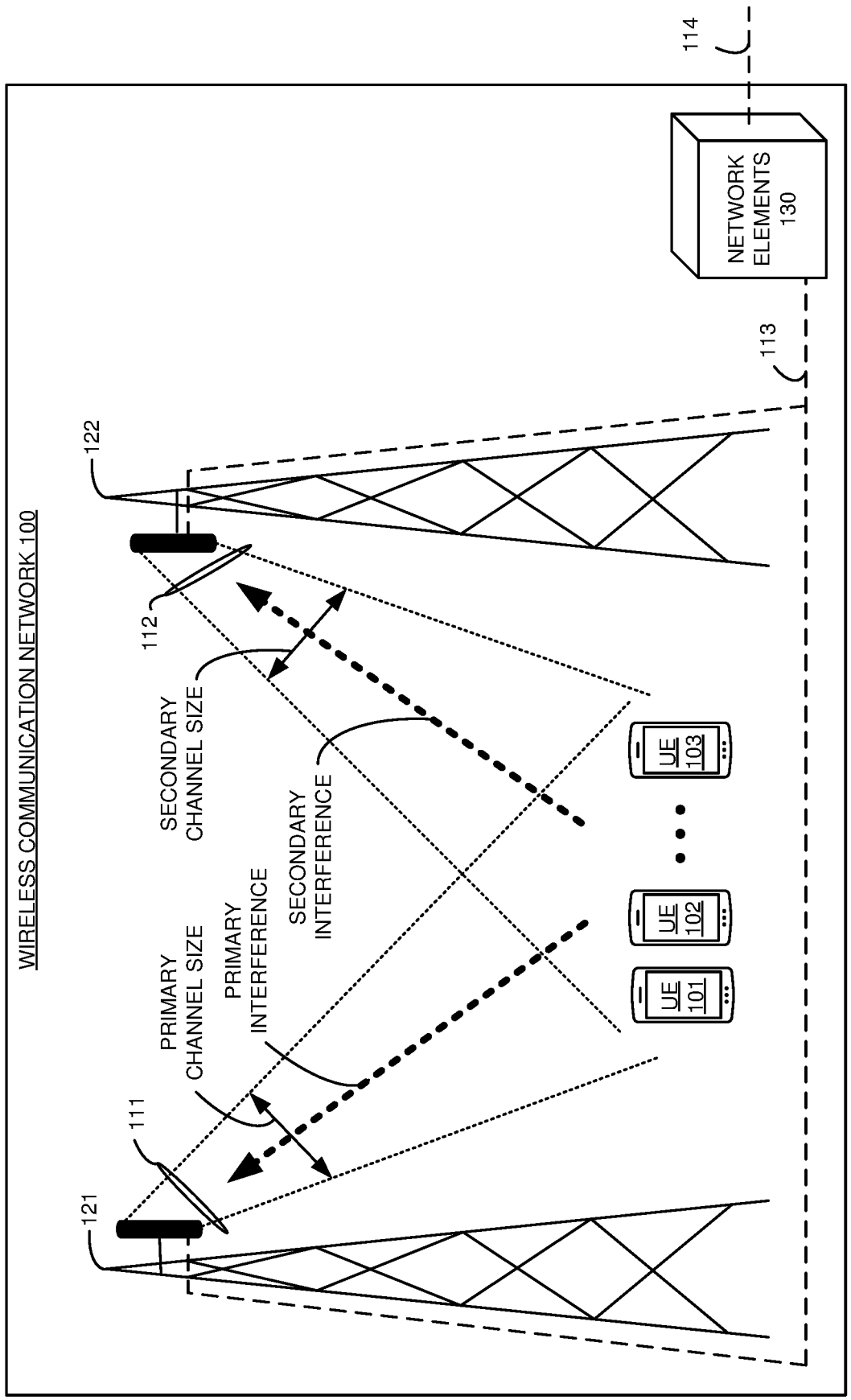
FIG. 1 illustrates a wireless communication network to serve User Equipment (UEs) over dynamically sized radio channels.

FIG. 1 illustrates a wireless communication network 100 to serve User Equipment (UEs) 101-103 over dynamically sized radio channels 111-112. Wireless communication network 100 delivers wireless data services like internet-access, video-calling, media-streaming, augmented-reality, machine-control, and/or some other wireless networking product. Wireless communication network 100 comprises wireless UEs 101-103, primary wireless access node 121, secondary wireless access node 122, and network elements 130. Wireless access nodes 121-122 are coupled to network elements 130 over backhaul links 113. Network elements 130 are coupled to external systems over external links 114. The amount of UEs that are depicted on FIG. 1 has been restricted for clarity, and access nodes 121-122 typically serve many more UEs in the manner of UE 101-103.

Various examples of network operation and configuration are described herein. In some examples, primary access node 121 wirelessly serves UEs 101-103 over primary radio channel 111 that has a primary channel size and that experiences primary uplink interference. Secondary access node 122 wirelessly serves UEs 101-103 over secondary radio channel 112 that has a secondary channel size and that experiences primary uplink interference. Primary access node 121 determines the primary uplink interference on primary radio channel 111 at primary access node 121. Secondary access node 122 determines the secondary uplink interference on secondary radio channel 112 at secondary access node 122. Secondary access node 122 indicates the secondary uplink interference to primary access node 121.

Primary access node 121 processes the primary uplink interference and the secondary uplink interference to responsively select a new primary channel size and a new secondary channel size. Primary access node 121 increases the primary channel size and correspondingly decreases the secondary channel size when the primary uplink interference is low and the secondary uplink interference is high. Primary access node 121 decreases the primary channel size and correspondingly increases the secondary channel size when the primary uplink interference is high and the secondary uplink interference is low. Primary access node 121 indicates the new secondary channel size to secondary access node 122. Primary access node 121 wirelessly serves UEs 101-103 over primary radio channel 111 that now has the new primary channel size. Secondary access node 122 wirelessly serves UEs 101-103 over secondary radio channel 112 that now has the new secondary channel size.

In some examples, access nodes 121-122 and UEs 101-103 use Multiple Input Multiple Output (MIMO) layers. The MIMO layers comprise parallel wireless links that share time and frequency resources—like sharing the same resource block. The same UE may use all of the MIMO layers, or multiple UEs may each use their own subset of the MIMO layers. Primary access node 121 wirelessly serves UEs 101-103 over primary radio channel 111 using a number of primary MIMO layers. Secondary access node 122 wirelessly serves UEs 101-103 over secondary radio channel 112 using a number of secondary MIMO layers. Secondary access node 122 indicates its amount of the secondary MIMO layers to primary access node 121. Primary access node 121 can then process the amount of primary and secondary MIMO layers along with the uplink interference to select the new channel sizes.

UEs 101-103 wirelessly communicate with access nodes 121-122 over radio channels 111-112 using Radio Access Technologies (RATs) like Fifth Generation New Radio (5GNR), Millimeter Wave (MMW), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Links 113-114 use metal, glass, air, or some other media. Links 113-114 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UEs 101-103 are depicted as smartphones, UEs 101-103 might instead comprise computers, robots, vehicles, or some other data appliances with wireless communication circuitry. Access nodes 121-122 are depicted as towers, but access nodes 121-122 may use other mounting structures or no mounting structure at all. Access nodes 121-122 may comprise gNodeBs, eNodeBs, MMW hotspots, LP-WAN base stations, and/or some other form of wireless network transceiver. Network elements 130 comprise Access and Mobility Management Functions (AMFs), User Plane Functions (UPFs), MMW controllers, Mobility Management Entities (MMEs), Gateways (GWs), Internet-of-Things (IoT) servers, Internet Protocol Multimedia Subsystem (IMS) servers, and/or some other form of wireless network apparatus. In some examples, network elements 130 comprise Virtual Network Functions (VNFs) in a Network Function Virtualization Infrastructure (NFVI).

UEs 101-103 and access nodes 121-122 comprise antennas, amplifiers, filters, modulation, and analog/digital interfaces. UEs 101-103, access nodes 121-122, and network elements 130 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
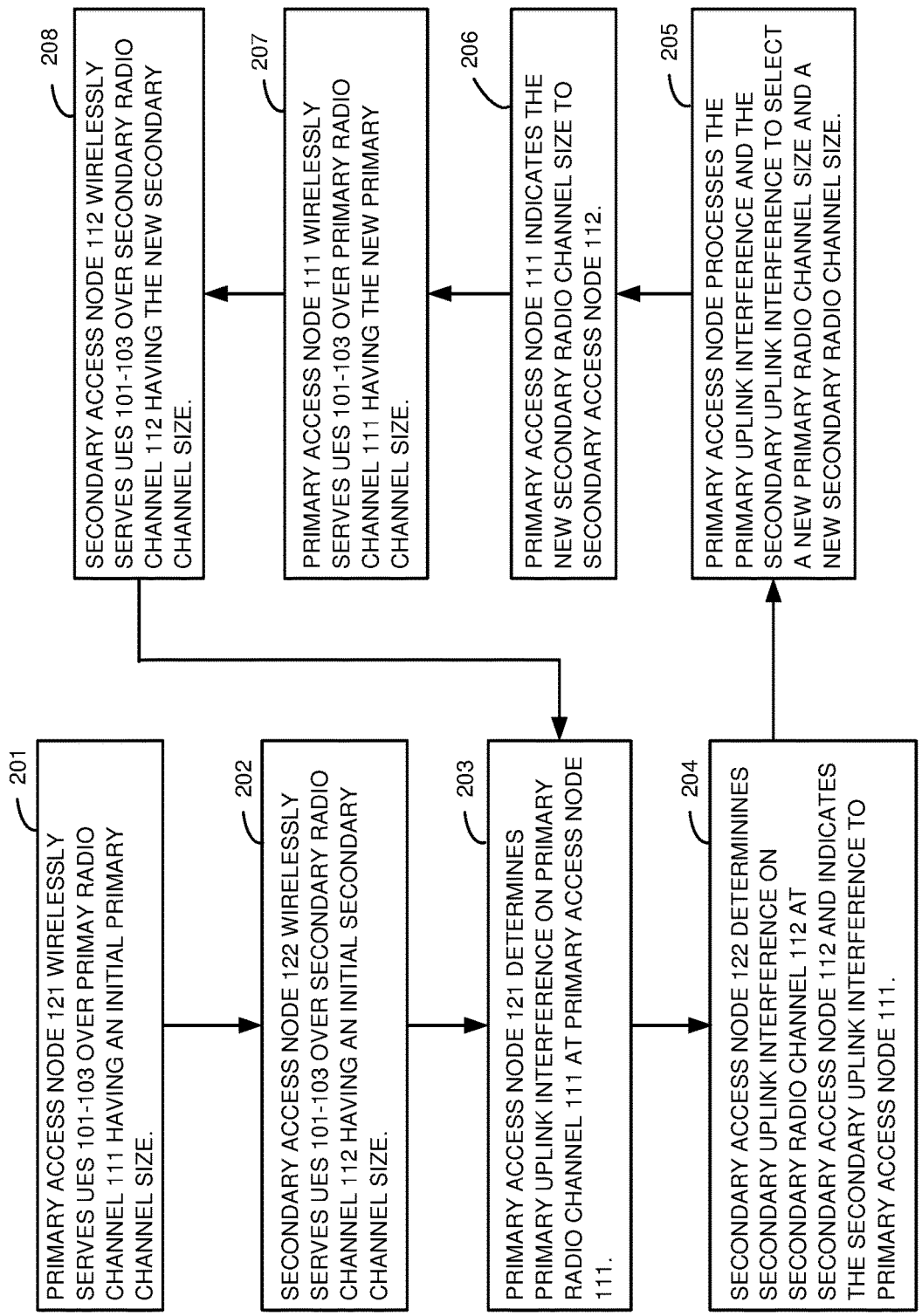
FIG. 2 illustrates an exemplary operation of the wireless communication network to serve the UEs over the dynamically sized radio channels.

FIG. 2 illustrates an exemplary operation of wireless communication network 100 to serve UEs 101-103 over dynamically sized radio channels 111-112. The operation may vary in other examples. In this example, primary access node 121 wirelessly serves UEs 101-103 over primary radio channel 111 having an initial primary channel size (201). Secondary access node 122 wirelessly serves UEs 101-103 over secondary radio channel 112 having an initial secondary channel size (202). Primary access node 121 determines the primary uplink interference on primary radio channel 111 at primary access node 121 (203). Secondary access node 122 determines secondary uplink interference on secondary radio channel 112 at secondary access node 122 and indicates the secondary uplink interference to primary access node 121 (204). Primary access node 121 processes the primary uplink interference and the secondary uplink interference to select a new primary channel size and a new secondary channel size (205). Primary access node 121 typically re-allocates a block of channel bandwidth from one access node to the other—like moving a five megahertz block from the primary radio channel to the secondary radio channel. Primary access node 121 indicates the new secondary channel size to secondary access node 122 (206). Primary access node 121 wirelessly serves UEs 101-103 over primary radio channel 111 now having the new primary channel size (207). Secondary access node 122 wirelessly serves UEs 101-103 over secondary radio channel 112 now having the new secondary channel size (208). The operation repeats (203).

Figure 3:
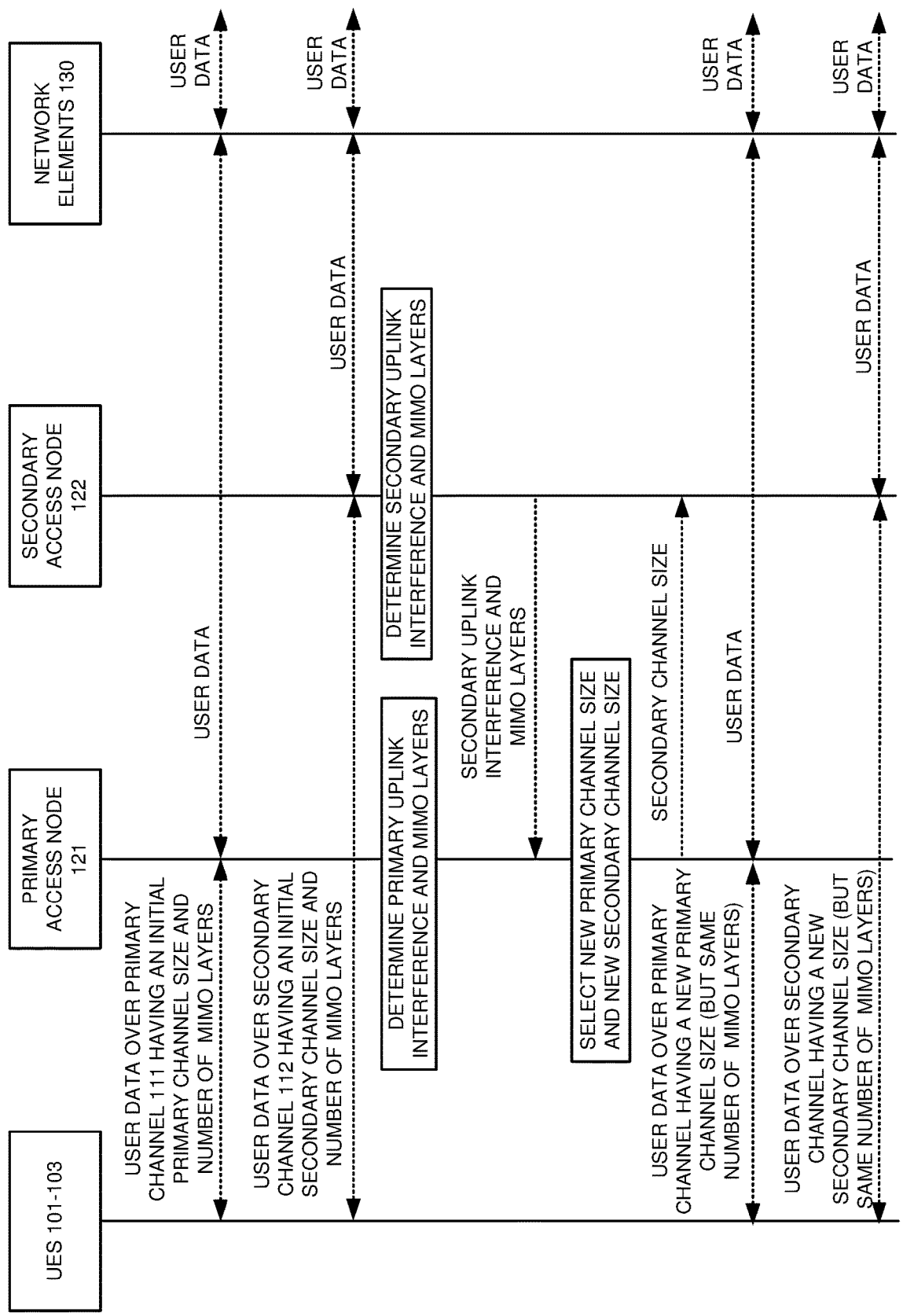
FIG. 3 illustrates an exemplary operation of the wireless communication network to serve the UEs over the dynamically sized radio channels.

FIG. 3 illustrates an exemplary operation of wireless communication network 100 to serve UEs 101-103 over dynamically sized radio channels 111-112. The operation may vary in other examples. In this example, primary access node 121 wirelessly exchanges user data with UEs 101-103 over primary radio channel 111 that has an initial primary channel size and an initial number of primary Multiple Input Multiple Output (MIMO) layers. Primary access node 121 exchanges the user data with network elements 130, and network elements 130 exchange at least some of the user data with external systems. Secondary access node 122 wirelessly exchanges user data with UEs 101-103 over secondary radio channel 112 that has an initial secondary channel size and an initial number of secondary MIMO layers. Primary access node 121 exchanges the user data with network elements 130, and network elements 130 exchange at least some of the user data with external systems.

Primary access node 121 determines the primary uplink interference on primary radio channel 111. Secondary access node 122 determines secondary uplink interference on secondary radio channel 112. For example, access nodes 121-122 may detect the uplink noise rise at their antennas. Secondary access node 122 indicates the secondary uplink interference and the secondary amount of MIMO layers to primary access node 121. Primary access node 121 processes the amounts of uplink interference and MIMO layers to select a new primary channel size and a new secondary channel size. Primary access node 121 indicates the new secondary channel size to secondary access node 122.

Primary access node 121 wirelessly exchanges user data with UEs 101-103 over primary radio channel 111 that now has the new primary channel size. Primary access node 121 typically uses the same number of primary MIMO layers as before. Primary access node 121 exchanges the user data with network elements 130 which exchange at least some of the user data with external systems. Secondary access node 122 wirelessly exchanges user data with UEs 101-103 over secondary radio channel 112 that now has the new secondary channel size. Secondary access node 112 typically uses the same number of secondary MIMO layers as before. Secondary access node 122 exchanges the user data with network elements 130 which exchange at least some of the user data with external systems.

Figure 4:
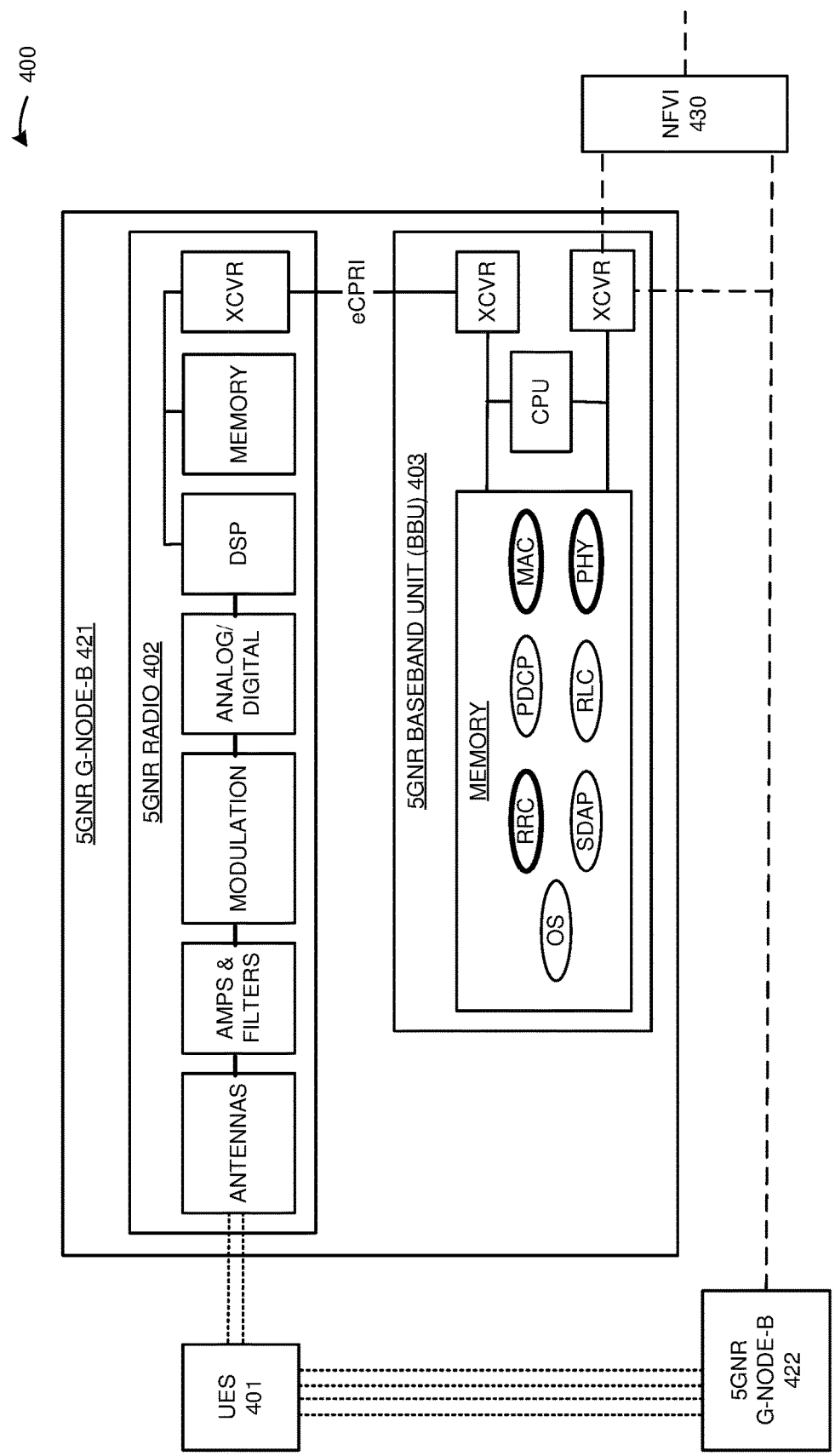
FIG. 4 illustrates a Fifth Generation (5G) communication network having a Fifth Generation New Radio (5GNR) gNodeBs to serve 5GNR UEs over dynamically sized radio channels.

FIG. 4 illustrates Fifth Generation (5G) communication 400 network having Fifth Generation New Radio (5GNR) gNodeBs 421-422 to serve 5GNR UEs 401 over dynamically sized radio channels. 5G communication network 400 comprises an example of wireless communication network 100, although network 100 may differ. 5G communication network 400 comprises UEs 401, 5GNR gNodeBs 421-422, and Network Function Virtualization Infrastructure (NFVI) 430. 5GNR gNodeBs 421-422 comprises an example of access nodes 121-122, although access nodes 121-122 may differ. 5GNR gNodeB 421 comprises 5GNR radio 402 and 5GNR Baseband Unit (BBU) 403. 5GNR radio 402 comprises antennas, amplifiers, filters, modulation, analog-to-digital interfaces, DSP, memory, and transceivers that are coupled over bus circuitry. 5GNR BBU 403 comprises memory, CPU, and transceivers that are coupled over bus circuitry. The memory in 5GNR BBU 403 stores an operating system and 5GNR network applications like Physical Layer (PHY), Media Access Control (MAC), Radio Link Control (RLC), Packet Data Convergence Protocol (PDCP), Service Adaptation Application Protocol (SDAP), and Radio Resource Control (RRC).

UEs 401 are wirelessly coupled to the antennas in 5GNR radio 402 over two primary MIMO layers in a primary radio channel that has a primary channel size. Transceivers in 5GNR radio 402 are coupled to transceivers in 5GNR BBU 403 over enhanced CPRI (eCPRI) links. Transceivers in 5GNR BBU 403 are coupled to NFVI 430 over backhaul links. The CPU in 5GNR BBU 403 executes the operating system, PHY, MAC, RLC, PDCP, SDAP, and RRC to exchange 5GNR signaling and data with UEs 401 and to exchange 5G Core (5GC) signaling and user data with NFVI 430 and other NodeBs. 5GNR BBU 403 may be physically separated into a Distributed Unit (DU) and a Centralized Unit (CU) that each resemble BBU 403. The CU and DU would each host a portion of the software in BBU 403 and would be coupled over fronthaul links.

In 5GNR radio 402, the antennas receive wireless 5GNR signals from UEs 401 that transport uplink 5GNR signaling and data. The wireless 5GNR signals include uplink 5GNR interference. The antennas transfer corresponding electrical uplink signals through duplexers to the amplifiers. The amplifiers boost the electrical uplink signals for filters which attenuate unwanted energy. Demodulators down-convert the filtered uplink signals from their carrier frequency. The analog/digital interfaces convert the demodulated analog uplink signals into digital uplink signals for the DSPs. The DSPs recover uplink 5GNR symbols from the uplink digital signals. In 5GNR BBU 403, the CPU executes the network applications to process the uplink 5GNR symbols and recover the uplink 5GNR signaling and the uplink 5GNR data. The network applications process the uplink 5GNR signaling and downlink Fifth Generation Core (5GC) signaling to generate new uplink 5GC signaling, new downlink 5GNR signaling, and new X2 signaling. The new downlink 5GNR signaling includes an information block that indicates the current radio channel size for 5GNR gNodeB 421. The RRC transfers the new uplink 5GC signaling to NFVI 430 and the X2 signaling to other NodeBs. The SDAP transfers corresponding 5GC data to NFVI 430 and the other NodeBs.

In 5GNR BBU 403, the RRC receives the 5GC signaling from NFVI 430 and X2 signaling from the other NodeBs. The SDAP receives 5GC data from NFVI 430 and the other NodeBs. The 5GNR network applications process the 5GNR signaling and data to generate corresponding downlink 5GNR symbols that carry the 5GNR signaling and data over a number of MIMO layers. In 5GNR radio 402, the DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UEs 401 that transport the downlink 5GNR signaling and data over the number of MIMO layers.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARD), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

5GNR gNodeB 422 is generally configured and operates like gNodeB 421. 5GNR gNodeB 422 wirelessly broadcasts 5GNR signaling that includes an information block that indicates the current radio channel size for 5GNR gNodeB 422. The antennas in the 5GNR radio in 5GNR gNodeB 422 are wirelessly coupled to UEs 401 over four secondary MIMO layers in a secondary radio channel that has a secondary channel size.

5GNR BBU 403 determines primary uplink noise rise on its primary radio channel. 5GNR BBU 403 determines its average amount of primary MIMO layers. The 5GNR BBU in 5GNR gNodeB 422 determines secondary uplink nose rise on its secondary radio channel and its average amount of secondary MIMO layers. The uplink noise rise comprises the uplink interference divided by the background noise. The 5GNR BBU in 5GNR gNodeB 422 indicates the secondary uplink noise rise and the average amount of secondary MIMO layers to 5GNR BBU 403 over X2 signaling.

5GNR BBU 403 processes the primary uplink noise rise, secondary uplink noise rise, primary amount of MIMO layers, and secondary amount of MIMO layers to select the primary channel size for 5GNR gNodeB 421 and the secondary channel size for 5GNR gNodeB 422. 5GNR BBU 403 increases the primary channel size and correspondingly decreases the secondary channel size in response to: decreasing primary uplink noise rise, increasing secondary uplink noise rise, increasing primary MIMO layers, and decreasing secondary MIMO layers. 5GNR BBU 403 decreases the primary channel size and correspondingly increases the secondary channel size in response to: increasing primary uplink noise rise, decreasing secondary uplink noise rise, decreasing primary MIMO layers, and increasing secondary MIMO layers. For example, the difference between the primary and secondary noise rises and the difference between the primary and secondary layer amounts could be determined, normalized, combined, and then translated into a new primary channel size and a new secondary channel size.

5GNR BBU 403 wirelessly broadcasts 5GNR signaling over 5GNR radio 402 that indicates the new primary channel size. 5GNR BBU 403 serves UEs 401 over 5GNR radio 402 using the new primary channel size and two MIMO layers. 5GNR BBU 403 indicates the new secondary channel size to the 5GNR BBU in 5GNR gNodeB 422 over X2 signaling. The 5GNR BBU in 5GNR gNodeB 422 wirelessly broadcasts 5GNR signaling over its 5GNR radio that indicates the new secondary channel size. The 5GNR BBU in 5GNR gNodeB 422 serves UEs 401 over the 5GNR radio in 5GNR gNodeB 422 using the new secondary channel size and four MIMO layers.

Figure 5:
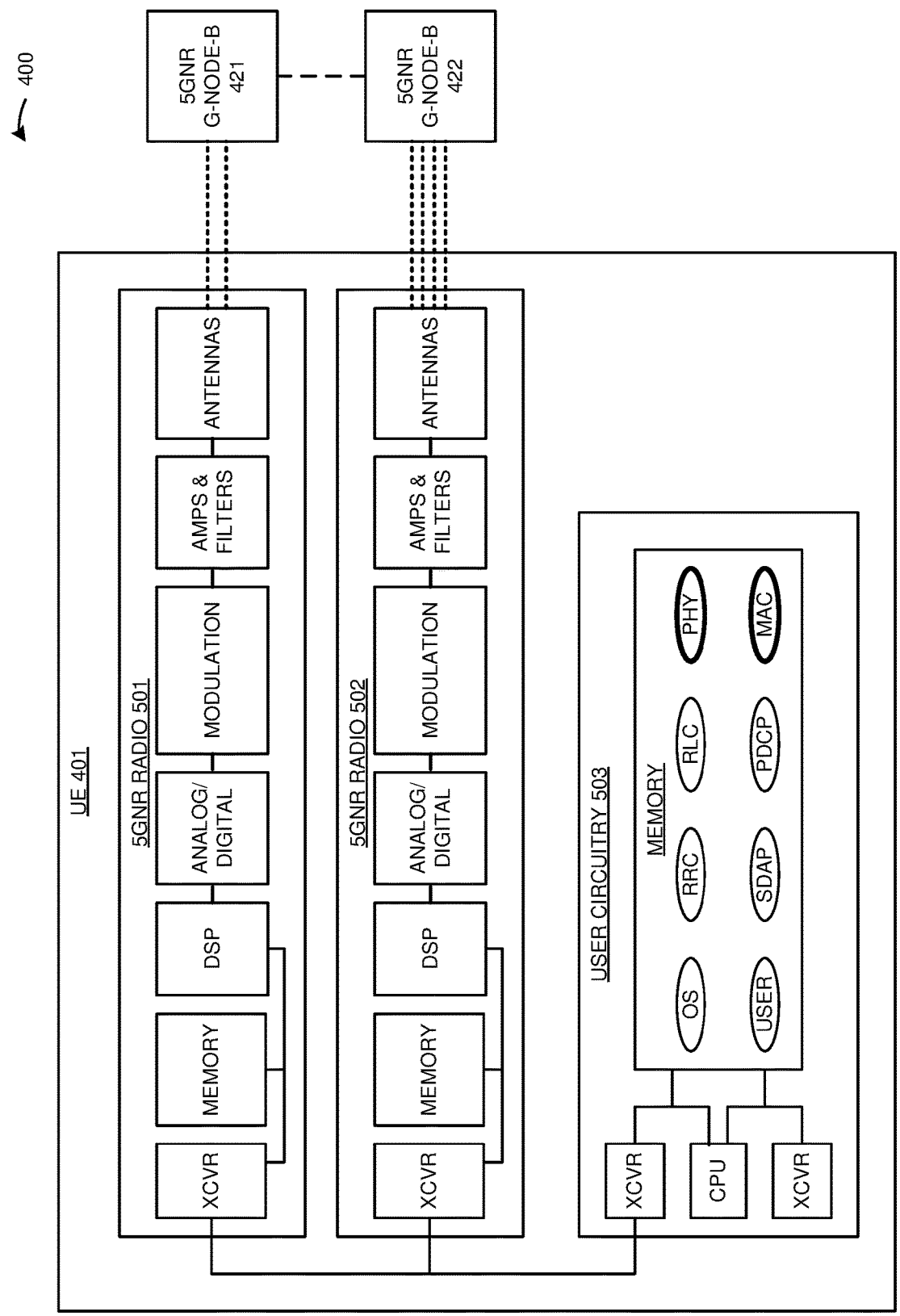
FIG. 5 illustrates one of the 5GNR UEs that is served by the 5GNR gNodeBs over dynamically sized radio channels.

FIG. 5 illustrates one of 5GNR UEs 401 that is served by 5GNR gNodeBs 421-422 over the dynamically sized radio channels. UE 401 comprises an example of UEs 101-103, although UEs 101-103 may differ. UE 401 comprises 5GNR radios 501-502 and user circuitry 503. 5GNR radios 501-502 comprises antennas, amplifiers, filters, modulation, analog-to-digital interfaces, DSP, memory, and transceivers that are coupled over bus circuitry. User circuitry 503 comprises memory, CPU, and transceivers that are coupled over bus circuitry. The memory in user circuitry 503 stores an operating system, user applications (USER), and 5GNR network applications for PHY, MAC, RLC, PDCP, SDAP, and RRC.

The antennas in 5GNR radio 501 are wirelessly coupled to 5GNR gNodeB 421 over two MIMO layers in a primary radio channel that has a primary channel size. The antennas in 5GNR radio 502 are wirelessly coupled to 5GNR gNodeB 422 over four MIMO layers in a secondary radio channel that has a secondary channel size. Transceivers in 5GNR radios 501-502 are coupled to transceivers in user circuitry 503. A transceiver in user circuitry 503 is typically coupled to user interfaces like displays, controllers, and memory. The CPU in user circuitry 503 executes the operating system, PHY, MAC, RLC, PDCP, SDAP, and RRC to exchange 5GNR signaling and data with 5GNR gNodeBs 421-422 over 5GNR radios 501-502.

In 5GNR radios 501-502, the antennas receive wireless signals from 5GNR gNodeB 420 that transport downlink 5GNR signaling and data. The 5GNR signaling from 5GNR gNodeB 421 indicates the current primary channel size for 5GNR gNodeB 421. The 5GNR signaling from 5GNR gNodeB 422 indicates the current secondary channel size for 5GNR gNodeB 422. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 503 over the transceivers. In user circuitry 503, the CPU executes the network applications to process the 5GNR symbols and recover the downlink 5GNR signaling and data—including processing the various MIMO layers. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the user applications.

The 5GNR network applications process the new uplink 5GNR signaling and user data to generate corresponding uplink 5GNR symbols that carry the uplink 5GNR signaling and data. In 5GNR radios 501-502, the DSPs process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5GNR NodeBs 421-422 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

Figure 6:
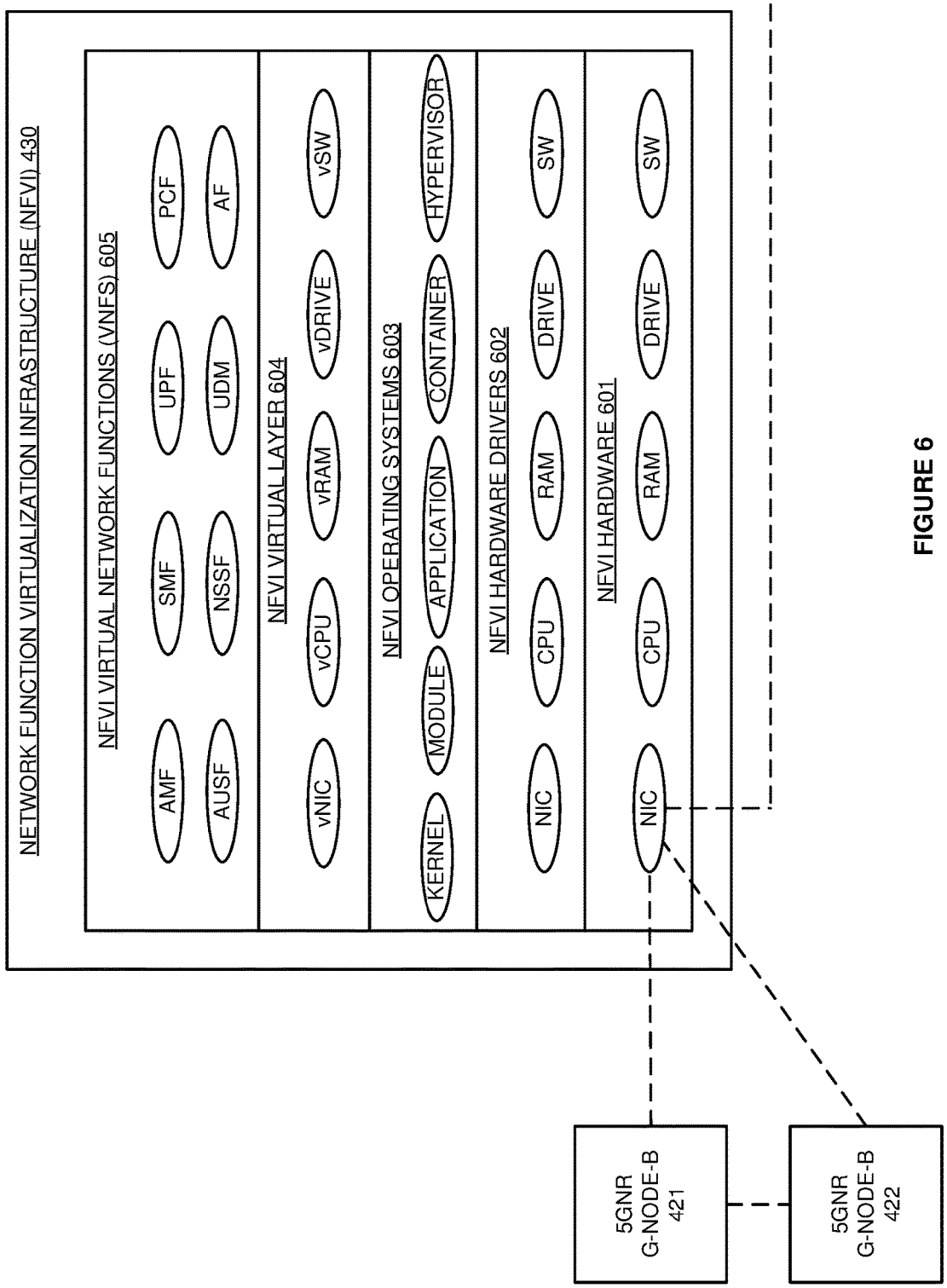
FIG. 6 illustrates a 5G Core (5GC) Network Function Virtualization Infrastructure (NFVI) to serve the 5GNR UEs over the 5GNR gNodeBs that dynamically size radio channels.

FIG. 6 illustrates 5G Core (5GC) Network Function Virtualization Infrastructure (NFVI) 430 to serve 5GNR UEs 401 over the 5GNR gNodeBs 421-422 that dynamically size radio channels. NFVI 430 comprises an example of network elements 130, although network elements 130 may differ. NFVI 430 comprises NFVI hardware 601, NFVI hardware drivers 602, NFVI operating systems 603, NFVI virtual layer 604, and NFVI Virtual Network Functions (VNFs) 605. NFVI hardware 601 comprises Network Interface Cards (NIC), CPU, RAM, flash/disk drives, and data switches (SW). NFVI hardware drivers 602 comprise software that is resident in the NIC, CPU, RAM, DRIVE, and SW. NFVI operating systems 603 comprise kernels, modules, applications, containers, hypervisors, and the like. NFVI virtual layer 604 comprises virtual NICs (vNIC), virtual CPUs (vCPU), virtual RAM (vRAM), virtual Drives (vDRIVE), and virtual Switches (vSW). NFVI VNFs 605 comprise Access and Mobility Management Functions (AMF), Session Management Functions (SMF), User Plane Functions (UPF), Policy Control Functions (PCF), Authentication and Security Functions (AUSF), Network Slice Selection Functions (NSSF), User Data Management Functions (UDM), and Application Functions (AF). Other VNFs are typically present but are omitted for clarity. The NIC are coupled to 5GNR gNodeBs 421-422 and external systems. NFVI hardware 601 executes NFVI hardware drivers 602, NFVI operating systems 603, NFVI virtual layer 604, and NFVI VNFs 605 to serve UE 401 and other UEs over 5GNR gNodeBs 421-422 and other NodeBs. NFVI 430 exchanges user data and 5GC signaling with 5GNR gNodeBs 421-422 and other NodeBs to serve wireless data services to UEs 401. NFVI 430 exchanges some of the user data with external systems.

Figure 7:
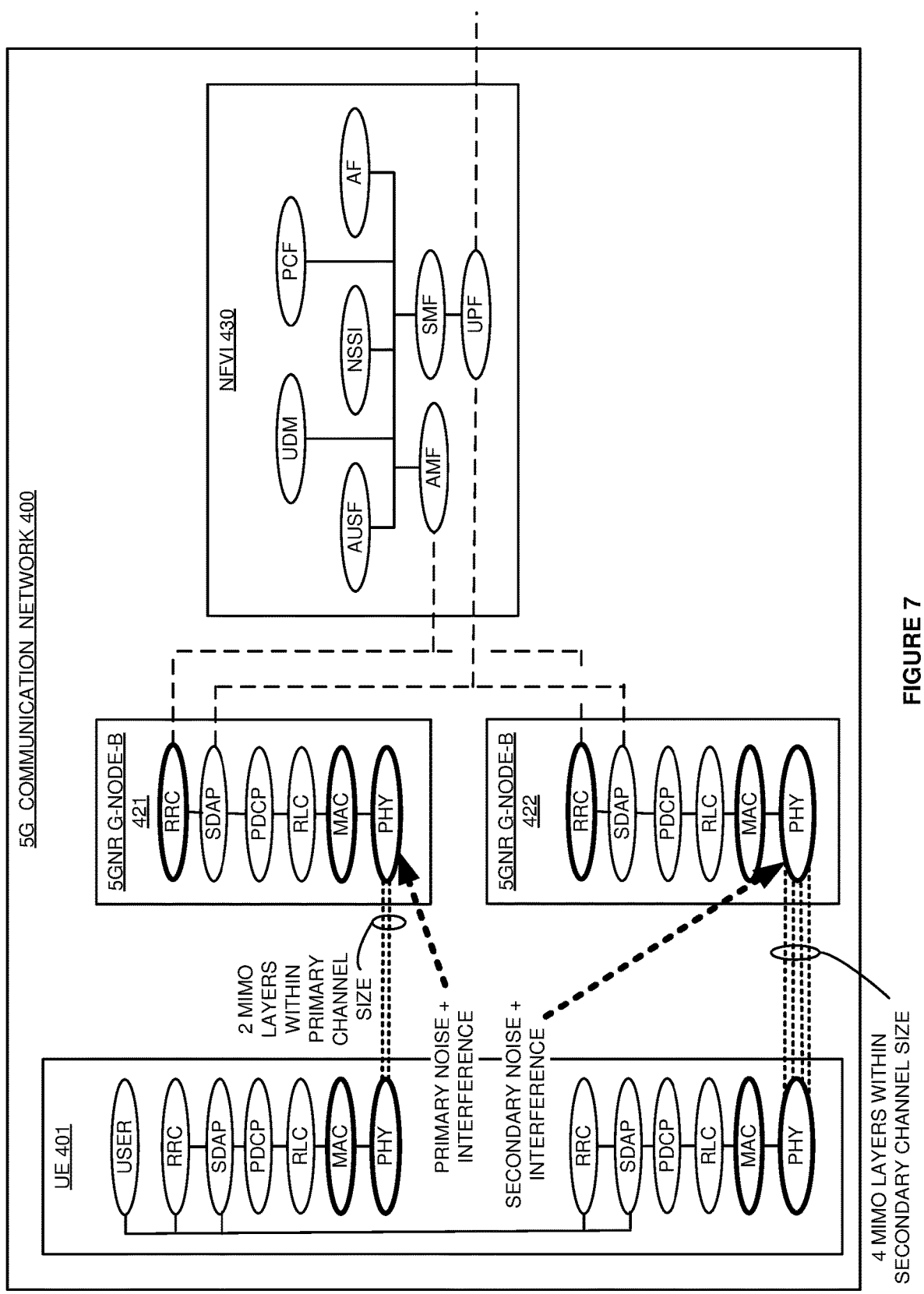
FIG. 7 illustrates an exemplary operation of the 5G communication network to serve one of the 5GNR UEs over the dynamically sized radio channels.

FIG. 7 illustrates an exemplary operation of 5G communication network 400 to serve 5GNR UE 401 over the dynamically sized radio channels. The illustrated operation is exemplary and may vary in other examples. The primary 5GNR network applications (RRC, SDAP, PDCP, RLC, MAC, and PHY) that use 5GNR radio 501 and 5GNR gNodeB 421 are shown at the top of UE 401. The secondary 5GNR network applications (RRC, SDAP, PDCP, RLC, MAC, and PHY) that use 5GNR radio 502 and 5GNR gNodeB 422 are shown at the bottom of UE 401. The 5GNR RRCs in 5GNR gNodeBs 421-422 wirelessly broadcast 5GNR information blocks that indicate their radio channel sizes. When the 5GNR RRCs in 5GNR gNodeBs 421-422 dynamically change their radio channel sizes, the RRCs wirelessly broadcast 5GNR information blocks that indicate the new radio channel sizes.

The primary 5GNR RRC in UE 401 attaches to the 5GNR RRC in 5GNR gNodeB 421 and indicates multi-radio capability of UE 401. The 5GNR RRC in gNodeB 421 exchanges 5GC signaling with the AMF in NFVI 430 and indicates the multi-radio capability. The AMF interacts with the AUSF and UDM to authenticate and authorize UE 401 for services using the multi-radio capability. The AMF interacts with the NSSI, SMF, and PCF to select slices, QoS, network addressing, and the like to deliver the wireless data services to UE 401. The SMF directs a UPF to serve UE 401 over 5GNR gNodeB 421. The AMF signals the RRC in 5GNR gNodeB 421 to serve UE 401 per the QoS and network addresses and to direct UE 401 to attach to the RRC in 5GNR gNodeB 422. The RRC in 5GNR gNodeB 421 signals the primary RRC in UE 401 indicating the selected slices, services, QoS, network addresses, and additional radio attachment.

The primary RRC in UE 401 directs the secondary RRC in UE 401 to attach to the RRC in 5GNR gNodeB 422. The secondary 5GNR RRC in UE 401 attaches to the 5GNR RRC in 5GNR gNodeB 422 to implement the multi-radio capability for UR 401. The 5GNR RRC in gNodeB 422 exchanges 5GC signaling with the AMF in NFVI 430. The AMF interacts with the NSSI, SMF, and PCF to identify the slices, QoS, network addressing, and the like for UE 401. The SMF directs the UPF to serve UE 401 over 5GNR gNodeB 422. The AMF signals the RRC in 5GNR gNodeB 422 to serve UE 401 per the QoS and network addresses. The RRC in 5GNR gNodeB 422 signals the secondary RRC in UE 401 indicating the identified slices, services, QoS, and network addresses.

The user applications in UE 401 exchange user signaling with the primary and secondary RRCs over the operating system and exchange user data with the SDAPs over the operating system. The primary and secondary RRCs in UE 401 and the RRCs in 5GNR gNodeBs 421-422 exchange 5GNR signaling to establish the selected services per the QoS. The primary and secondary SDAPs in UE 401 and the SDAPs in 5GNR gNodeBs 421-422 exchange the user data to deliver the selected services per the QoS. The 5GNR downlinks two MIMO layers from 5GNR gNodeB 421 to UE 401 and four MIMO layers from 5GNR gNodeB 422 to UE 401. The SDAPs in 5GNR gNodeBs 421-422 and the UPF in NFVI 430 exchange the user data to deliver the selected services per the QoS. The UPF in NFVI 430 and external systems exchange the user data to deliver the selected services per the QoS.

The primary PHY in UE 401 and the PHY in 5GNR gNodeB 421 are wirelessly coupled over two primary MIMO layers in a primary radio channel that has a primary channel size. The secondary PHY in UE 401 and the PHY in 5GNR gNodeB 422 are wirelessly coupled over four secondary MIMO layers in a secondary radio channel that has a secondary channel size. The PHY in 5GNR gNodeB 421 determines uplink noise rise on the primary radio channel. The PHY in 5GNR gNodeB 421 determines its average amount of primary MIMO layers. The PHY in 5GNR gNodeB 422 determines uplink noise rise on the secondary radio channel. The PHY in 5GNR gNodeB 422 determines its average amount of secondary MIMO layers. The PHY in 5GNR gNodeB 422 indicates the secondary uplink noise rise and MIMO layers to the PHY in 5GNR gNodeB 421. The PHY in 5GNR gNodeB 421 processes the primary uplink noise rise, secondary uplink noise rise, primary MIMO layer amount, and secondary MIMO layer amount to select the primary channel size and the secondary channel size.

The PHY in 5GNR gNodeB 421 increases the primary channel size and correspondingly decreases the secondary channel size in response to: decreasing primary uplink noise rise, increasing secondary uplink noise rise, increasing primary MIMO layers, and decreasing secondary MIMO layers. The PHY in 5GNR gNodeB 421 decreases the primary channel size and correspondingly increases the secondary channel size in response to: increasing primary uplink noise rise, decreasing secondary uplink noise rise, decreasing primary MIMO layers, and increasing secondary MIMO layers. For example, the difference between the primary and secondary noise rises and the difference between the primary and secondary layer amounts could be determined, normalized, combined, and then translated into a new primary channel size and a new secondary channel size. The change in channel size may comprise the allocation of a bandwidth block from one NodeB to the other.

The PHY in 5GNR gNodeB 421 indicates the new primary channel size to the MAC and RRC in gNodeB 421. The RRC in 5GNR gNodeB 421 indicates the new secondary channel size to the RRC in 5GNR gNodeB 422 which notifies the PHY and MAC in gNodeB 422. The MAC in 5GNR gNodeB 421 responsively schedules primary resource blocks for UEs 401 from the primary radio channel within the new primary channel size. The MAC in 5GNR gNodeB 422 schedules secondary resource blocks for UEs 401 from the secondary radio channel within the new secondary channel size. The RRCs in 5GNR gNodeBs 421-422 now broadcast the new channel sizes in their information blocks.

Figure 8:
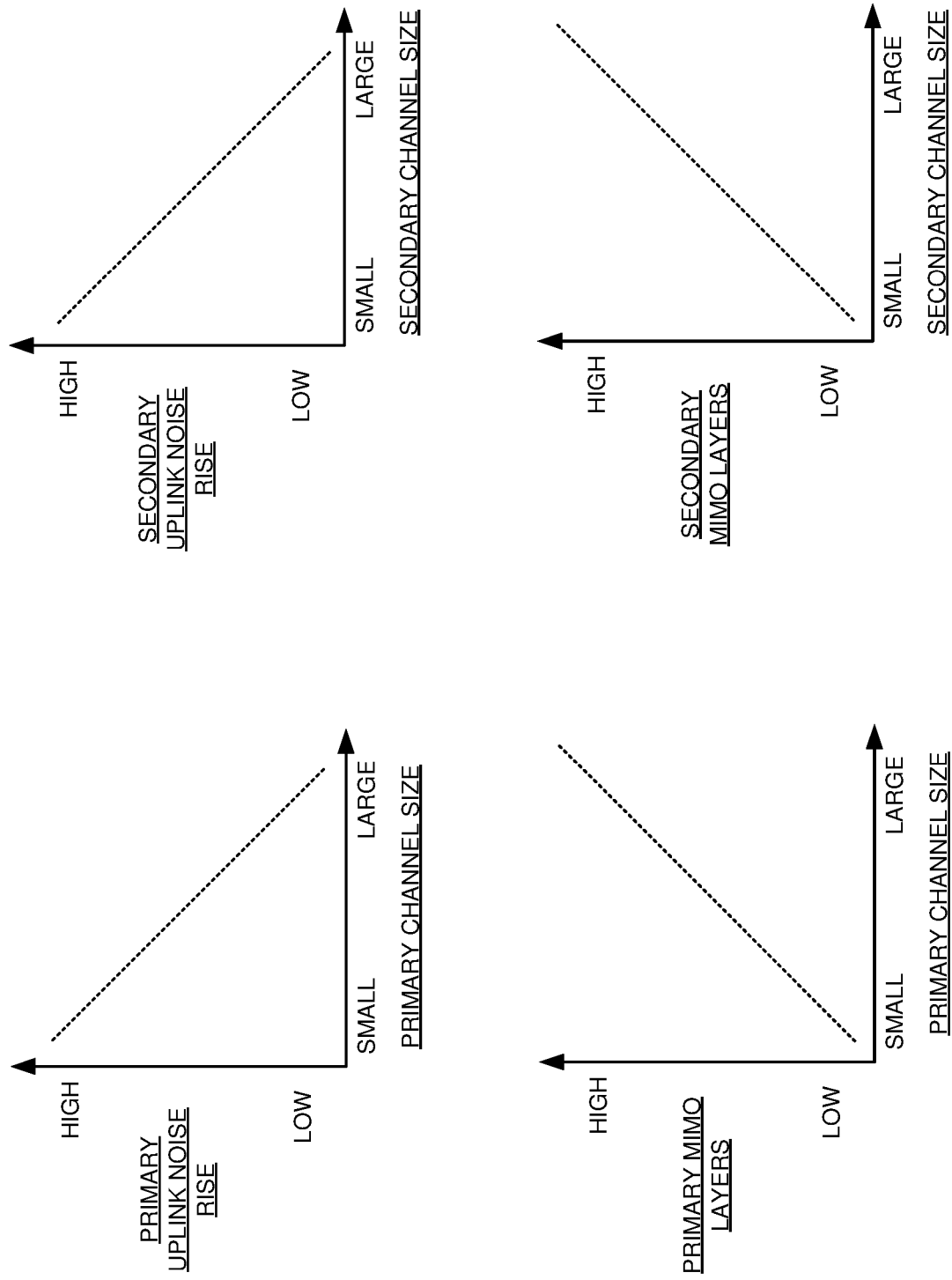
FIG. 8 illustrates an exemplary operation of the 5GNR gNodeBs to serve the 5GNR UEs over the dynamically sized radio channels.

FIG. 8 illustrates an exemplary operation of 5GNR gNodeB 421 to serve 5GNR UEs 401 over the dynamically sized radio channels. The top left graph depicts the relation of primary uplink noise rise to primary channel size. The top right graph depicts the relation of secondary uplink noise rise to secondary channel size. On both top graphs, high noise rise correlates to small channel size and low noise rise correlates to large channel size. The bottom left graph depicts the relation of primary MIMO layers to primary channel size. The bottom right graph depicts the relation of secondary MIMO layers rise to secondary channel size. On both bottom graphs, a high number of MIMO layers correlates to large channel size and a low number of MIMO layers correlates to small channel size. The graphs could be reduced to data structures that are hosted by 5GNR gNodeB 421.

In some examples, 5GNR gNodeB 421 selects the primary channel size and the secondary channel size as follows. A total channel size is available for 5GNR gNodeBs 421-422. 5GNR gNodeB 421 multiplies the total channel size by a primary factor to determine the primary channel size. 5GNR gNodeB 421 subtracts the primary channel size from the total channel size to determine the secondary channel size. The primary factor comprises the product of an interference factor, MIMO factor, and weighting factors. For example, primary factor=(Total Channel Size)×[(Weight A)×(Secondary Interference)/(Primary Interference)]×[(Weight B)×(Primary MIMO Layers)/(Secondary MIMO Layers)]. Subtraction could replace division to determine the interference and layer differences in other examples. The Weights A and B could vary by deployment and be optimized through empirical testing.

The wireless data network circuitry described above comprises computer hardware and software that form special-purpose network circuitry to dynamically size radio channels while wirelessly serving UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to dynamically size radio channels while wirelessly serving UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UEs) over Multiple Input Multiple Output (MIMO) layers, the method comprising:
   a primary access node wirelessly serving the UEs over a primary amount of the MIMO layers in a primary radio channel having an initial primary channel size;
   a secondary access node wirelessly serving the UEs over a secondary amount of the MIMO layers in a secondary radio channel having an initial secondary channel size and indicating the secondary amount of the MIMO layers to the primary access node;
   the primary access node selecting a new primary channel size and selecting a new secondary channel size based on the primary amount of the MIMO layers and the secondary amount of the MIMO layers and indicating the new secondary channel size to the secondary access node;
   the primary access node wirelessly serving the UEs over the primary amount of the MIMO layers in the primary radio channel having the new primary channel size; and
   the secondary access node wirelessly serving the UEs over the secondary amount of the MIMO layers in the secondary radio channel having the new secondary channel size.

2. The method of claim 1 further comprising the primary access node determining a layer amount difference between the primary amount of the MIMO layers and the secondary amount of the MIMO layers and selecting the new primary channel size and the new secondary channel size based on the layer amount difference.

3. The method of claim 1 wherein the primary access node selecting the new primary channel size and the new secondary channel size comprises moving a bandwidth block from the secondary radio channel to the primary radio channel.

4. The method of claim 1 wherein the primary access node selecting the new primary channel size and the new secondary channel size comprises moving a bandwidth block from the primary radio channel to the secondary radio channel.

5. The method of claim 1 further comprising:
   the primary access node wirelessly broadcasting the initial primary channel size when using the initial primary channel size and wirelessly broadcasting the new primary channel size when using the new primary channel size; and
   the secondary access node wirelessly broadcasting the initial secondary channel size when using the initial secondary channel size and wirelessly broadcasting the new secondary channel size when using the new secondary channel size.

6. The method of claim 1 wherein:
   the primary access node wirelessly serving the UEs over the primary radio channel having the new primary channel size comprises a primary Media Access Control (MAC) scheduling primary resource blocks for the UEs from the primary radio channel within the new primary channel size; and the secondary access node wirelessly serving the UEs over the secondary radio channel having the new secondary channel size comprises a secondary MAC scheduling secondary resource blocks for the UEs from the secondary radio channel within the new secondary channel size.

7. The method of claim 1 further comprising:

the primary access node determining primary uplink interference on the primary radio channel at the primary access node;

the secondary access node determining secondary uplink interference on the secondary radio channel at the secondary access node and indicating the secondary uplink interference to the primary access node; and wherein the primary access node selecting the new primary channel size and selecting the new secondary channel size comprises selecting the new primary channel size and selecting the new secondary channel size based on the primary uplink interference, the primary amount of the MIMO layers, the secondary uplink interference, and the secondary amount of the MIMO layers.

8. The method of claim 1 further comprising:

the primary access node determining primary uplink noise rise on the primary radio channel at the primary access node;

the secondary access node determining secondary uplink noise rise on the secondary radio channel at the secondary access node and indicating the secondary uplink noise rise to the primary access node; and wherein the primary access node selecting the new primary channel size and selecting the new secondary channel size comprises selecting the new primary channel size and selecting the new secondary channel size based on the primary uplink noise rise, the primary amount of the MIMO layers, the secondary uplink noise rise, and the secondary amount of the MIMO layers.

9. The method of claim 1 wherein the primary access node comprises a Fifth Generation New Radio (5GNR) gNodeB.

10. The method of claim 1 wherein the secondary access node comprises a Fifth Generation New Radio (5GNR) gNodeB.

11. A wireless communication network to serve User Equipment (UEs) over Multiple Input Multiple Output (MIMO) layers, the wireless communication network comprising:

a primary access node configured to wirelessly serve the UEs over a primary amount of the MIMO layers in a primary radio channel having an initial primary channel size;

a secondary access node configured to wirelessly serve the UEs over a secondary amount of the MIMO layers in a secondary radio channel having an initial secondary channel size and indicating the secondary amount of the MIMO layers to the primary access node;

the primary access node configured to select a new primary channel size and select a new secondary channel size based on the primary amount of the MIMO layers and the secondary amount of the MIMO layers and indicate the new secondary channel size to the secondary access node;

the primary access node configured to wirelessly serve the UEs over the primary amount of the MIMO layers in the primary radio channel having the new primary channel size; and the secondary access node configured to wirelessly serve the UEs over the secondary amount of the MIMO layers in the secondary radio channel having the new secondary channel size.

12. The wireless communication network of claim 11 wherein the primary access node is configured to determine a layer amount difference between the primary amount of the MIMO layers and the secondary amount of the MIMO layers and select the new primary channel size and the new secondary channel size based on the layer amount difference.

13. The wireless communication network of claim 11 wherein the primary access node is configured to move a bandwidth block from the secondary radio channel to the primary radio channel to select the new primary channel size and the new secondary channel size.

14. The wireless communication network of claim 11 wherein the primary access node is configured to move a bandwidth block from the primary radio channel to the secondary radio channel to select the new primary channel size and the new secondary channel size.

15. The wireless communication network of claim 11 further comprising:

the primary access node configured to wirelessly broadcast the initial primary channel size when using the initial primary channel size and wirelessly broadcast the new primary channel size when using the new primary channel size; and the secondary access node configured to wirelessly broadcast the initial secondary channel size when using the initial secondary channel size and wirelessly broadcast the new secondary channel size when using the new secondary channel size.

16. The wireless communication network of claim 11 wherein:

the primary access node comprises a primary Media Access Control (MAC) configured to schedule primary resource blocks for the UEs from the primary radio channel within the new primary channel size; and the secondary access node comprises a secondary MAC configured to schedule secondary resource blocks for the UEs from the secondary radio channel within the new secondary channel size.

17. The wireless communication network of claim 11 further comprising:

the primary access node configured to determine primary uplink interference on the primary radio channel at the primary access node;

the secondary access node configured to determine secondary uplink interference on the secondary radio channel at the secondary access node and indicate the secondary uplink interference to the primary access node; and wherein the primary access node is configured to select the new primary channel size and select the new secondary channel size based on the primary uplink interference, the primary amount of the MIMO layers, the secondary uplink interference, and the secondary amount of the MIMO layers.

18. The wireless communication network of claim 11 further comprising:

the primary access node configured to determine primary uplink noise rise on the primary radio channel at the primary access node;

the secondary access node is configured to determine secondary uplink noise rise on the secondary radio channel at the secondary access node and indicate the secondary uplink noise rise to the primary access node; and wherein the primary access node is configured to select the new primary channel size and select the new secondary channel size based on the primary uplink noise rise, the primary amount of the MIMO layers, the secondary uplink noise rise, and the secondary amount of the MIMO layers.

19. The wireless communication network of claim 11 wherein the primary access node comprises a Fifth Generation New Radio (5GNR) gNodeB.

20. The wireless communication network of claim 11 wherein the secondary access node comprises a Fifth Generation New Radio (5GNR) gNodeB.

* * * * *